(No Model.)
D. R. SAUNDERS.
ATTACHMENT FOR BICYCLES.
No. 585,288. Patented June 29, 1897.
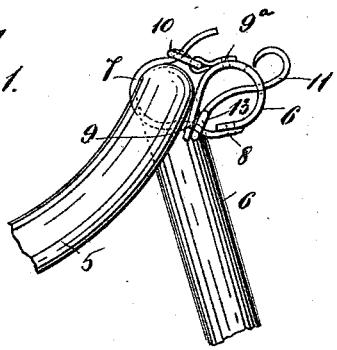
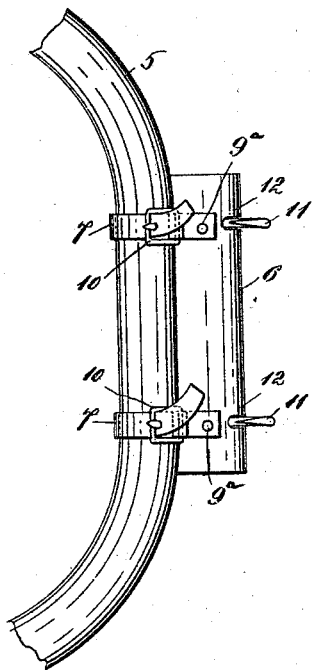

UNITED STATES PATENT OFFICE.

DAVID ROBERT SAUNDERS, OF HOUSTON, TEXAS, ASSIGNOR OF ONE-HALF TO JACOB M. LEE, OF SAME PLACE.

ATTACHMENT FOR BICYCLES.

SPECIFICATION forming part of Letters Patent No. 585,288, dated June 29, 1897.

Application filed February 9, 1897. Serial No. 622,632. (No model.)

*To all whom it may concern:*

Be it known that I, DAVID ROBERT SAUNDERS, a citizen of the United States, residing at Houston, in the county of Harris and State of Texas, have invented certain new and useful Improvements in Attachments for Bicycles, of which the following is a full and complete specification, such as will enable those skilled in the art to which it appertains to make and use the same.

This invention relates to attachments for bicycles and similar vehicles; and the object thereof is to provide an improved device of this class which is adapted to serve as a package-carrier and which is adapted to be connected with the frame of the bicycle, as hereinafter described.

The invention is fully disclosed in the following specification, of which the accompanying drawings form a part, in which I have shown my improvement applied to the handle-bar of a bicycle, and in which—

Figure 1 is a side view of a part of the handle-bar of a bicycle and the downwardly-directed rod with which it is in practice connected with the frame of the vehicle, and Fig. 2 a plan view thereof.

In the drawings forming part of this specification the separate parts of my improvement are designated by the same numerals of reference in each of the views, and in said drawings I have shown at 5 a part of the handle-bar of a bicycle and at 6 the rod, which is connected therewith and by means of which the handle-bar may be connected with the vehicle in the usual manner, and in the practice of my invention I provide a package-carrier which consists of a tube composed of a strip of leather or similar material, to one side of which is secured two straps 7, as shown at 8, and the opposite side of said strip of leather is folded over to form a tube and provided with openings, through which the straps 7 are passed, as shown at 9, and the tube thus folded is provided on the upper side thereof with short straps 9ª, to which buckles 10 are secured, and in connecting the package-carrier with the vehicle the straps 7 are passed around the handle-bar at the middle thereof and through the buckles 10, as clearly shown in the drawings. I also provide two metal hooks 11, which are passed through holes 12 in the outer side of the tube, and each of which is provided with a head 13, through which the straps 7 are passed before they are passed through the free side of the strip from which the tube is formed, and said hooks 11 when thus connected with the package-carrier project outwardly through the holes 12, as clearly shown in Figs. 1 and 2.

The hooks 11 are designed to support a package of any kind or class which is suspended therefrom, as will be readily understood, and the tube 6 is designed to hold a folded flexible article of any kind or any other article that may be placed therein.

This device is simple in construction and operation and is perfectly adapted to accomplish the result for which it is intended and is also comparatively inexpensive, and it is evident that changes in and modifications of the construction herein described may be made without departing from the spirit of my invention or sacrificing its advantages.

Having fully described my invention, I claim as new and desire to secure by Letters Patent—

1. The herein-described attachment for bicycles and similar vehicles, the same consisting of a tubular part formed by folding a strip of leather so as to form a tube, said strip of leather being provided at one side with straps which are passed through the opposite side when the strip is folded, and said tube being also provided with buckles through which the other ends of said straps are passed, and with hooks which are held therein by said straps and which project therefrom, substantially as shown and described.

2. The herein-described attachment for bicycles and similar vehicles consisting of a tubular part formed by folding a strip of leather so as to form a tube, said strip being provided with two straps at one edge thereof, and with two openings at the opposite edge, which are adapted to permit the said straps to pass therethrough, and being also provided with two short straps on the body portion thereof, said short straps being provided with buckles adapted to engage said straps, and metal hooks secured to said straps by means of heads through which the straps pass, said hooks being projected outwardly through holes formed in the said tube, substantially as shown and described.

In testimony that I claim the foregoing as my invention I have signed my name, in presence of the subscribing witnesses, this 2d day of February, 1897.

DAVID ROBERT SAUNDERS.

Witnesses:
JAMES HORRIE,
STONEWALL BOND.